(12) United States Patent
Hauvespre et al.

(10) Patent No.: US 10,962,099 B2
(45) Date of Patent: Mar. 30, 2021

(54) CAM FOLLOWER ROLLER DEVICE

(71) Applicant: Aktiebolaget SKF, Gothenburg (SE)

(72) Inventors: Benoît Hauvespre, Saint Etienne de Chigny (FR); Laurent Jourdain, Chambray-les-tours (FR); Philippe Walter, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 33 days.

(21) Appl. No.: 15/890,639

(22) Filed: Feb. 7, 2018

(65) Prior Publication Data

US 2018/0274647 A1 Sep. 27, 2018

(30) Foreign Application Priority Data

Mar. 23, 2017 (DE) .......................... 102017204920.0

(51) Int. Cl.
| | |
|---|---|
| *F01L 1/14* | (2006.01) |
| *F16H 53/06* | (2006.01) |
| *F04B 1/0413* | (2020.01) |
| *F04B 53/00* | (2006.01) |
| *F04B 1/0408* | (2020.01) |
| *F04B 1/0417* | (2020.01) |
| *F02M 59/10* | (2006.01) |

(52) U.S. Cl.
CPC .............. *F16H 53/06* (2013.01); *F01L 1/143* (2013.01); *F04B 1/0408* (2013.01); *F04B 1/0413* (2013.01); *F04B 1/0417* (2013.01); *F04B 53/00* (2013.01); *F01L 1/14* (2013.01); *F01L 1/146* (2013.01); *F01L 2301/00* (2020.05); *F01L 2305/00* (2020.05); *F02M 59/102* (2013.01)

(58) Field of Classification Search
CPC ......... F16H 53/06; F02M 59/102; F01L 1/14; F01L 2105/00

USPC .......................................... 123/90.44, 90.48
See application file for complete search history.

(56) References Cited

U.S. PATENT DOCUMENTS

| | | | |
|---|---|---|---|
| 6,688,269 B1 * | 2/2004 | Steinmetz | F01L 1/14 123/90.48 |
| 10,024,201 B2 | 7/2018 | Viault | |
| 2014/0150602 A1 * | 6/2014 | Hauvespre | F04B 1/0426 74/569 |

(Continued)

FOREIGN PATENT DOCUMENTS

| | | |
|---|---|---|
| DE | 102010033120 A1 | 2/2012 |
| DE | 102014226853 A1 | 6/2015 |

(Continued)

OTHER PUBLICATIONS

Dorn et al., Tappet, US Patent Application Pub. No. US 2015/0192098, Jul. 9, 2015. (Year: 2015).*

*Primary Examiner* — Zelalem Eshete
(74) *Attorney, Agent, or Firm* — Garcia-Zamor Intellectual Property Law; Ruy Garcia-Zamor; Bryan Peckjian

(57) ABSTRACT

A cam follower roller device having a tappet body extending along a longitudinal axis and defining a tappet bore, a pin centered on a transverse axis and providing two opposite ends arranged in through-holes transversally facing one another on tappet body, and a roller rotatably mounted on the pin around said transverse axis. The tappet body is a machined metal tube or bar and is provided with a radial plate that is securely fixed within tappet bore, said radial plate being dedicated to support a longitudinally movable piston.

9 Claims, 3 Drawing Sheets

(56) References Cited

U.S. PATENT DOCUMENTS

2015/0330264 A1* 11/2015 Hauvespre ................ F01L 1/14
74/519
2015/0337941 A1* 11/2015 Champalou ............... F01L 1/46
74/569

FOREIGN PATENT DOCUMENTS

| DE | 102017211786 A1 | 2/2018 |
|----|----|----|
| EP | 2960446 A1 | 12/2015 |

* cited by examiner

CAM FOLLOWER ROLLER DEVICE

CROSS-REFERENCE

This application claims priority to German patent application no. 102017204920.0 filed on Mar. 23, 2017, the contents of which are fully incorporated herein by reference.

TECHNOLOGICAL FIELD

The invention relates to a cam follower roller device used in automotive or industrial applications.

One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND

Such a cam follower roller device generally comprises an outer tappet body, a roller and a pin in bronze or steel. The roller is rotatably mounted on the pin and the rolling assembly is centered on a transverse axis, while the tappet extends along a longitudinal axis. The tappet is formed with a cylindrical body delimiting an internal volume wherein are arranged the pin and the roller.

For example in EP-A1-2 960 446, DE-A1-10 2014 226853 or DE-A1-10 2010 033120, it is well known to provide tappet body with transverse through-holes transversally facing one another to receive ends of pin. Tappet body further comprises an inner axial bottom wall dedicated to support a piston in longitudinal movement.

The roller axially extends from the tappet so as to collaborate with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis.

Such a cam follower roller device is generally delivered as a pre-assembled unit to a motor vehicle manufacturer or system supplier. It is known to design a forged tappet body in metal. However, such a tappet body is relatively expensive to produce and it is desirable to reduce device cost.

SUMMARY

The aim of the invention is to propose a unitary cam follower roller device with a cost-saving design and easy to assemble.

To this end, the invention relates to a cam follower roller device comprising a tappet body extending along a longitudinal axis and defining a tappet bore, a pin centered on a transverse axis and comprising two opposite ends arranged in through-holes transversally facing one another on tappet body, and a roller rotatably mounted on the pin around said transverse axis.

According to the invention, the tappet body is a machined metal tube or bar and is provided with a radial plate that is securely fixed within tappet bore, said radial plate being dedicated to support a longitudinally movable piston.

Thanks to the invention, the tappet body is machined from a metal tube or a metal bar, and not forged. The manufacturing process is less restrictive and permits to design complex shapes.

Forging requires dedicated expensive tools, turning, boring and rectifying process steps, and thermal treatment. A machined tappet body is less expensive than a forged one. Furthermore, a machined tappet body weight is reduced compared to a forged one.

Tappet body machined from a metal tube delimits tappet bore surrounded by a substantially cylindrical wall. The radial plate is securely fixed within said bore and ensures the supporting function of cam follower roller device with a longitudinally movable piston of motor engine.

Tappet body and radial plate are assembled together so as to form a unitary tappet. Cam follower roller device according to the invention is deliverable as a pre-assembled unit to a motor vehicle manufacturer or system supplier. Device transport is safe, disassembly of tappet body and radial plate being prevented.

According to further aspects of the invention which are advantageous but not compulsory, such a cam follower roller device may incorporate one or several of the following features:

- At least one inwardly transversally protruding portion is provided in tappet bore so as to form a longitudinal stop for the radial plate, said protruding portion being longitudinally positioned between the roller and the radial plate.
- The radial plate is a disk.
- The radial plate is stepped and comprises an outer circumferential shoulder.
- At least one lubricant channel is provided substantially longitudinally through radial plate.
- At least one lubricant channel is provided from the exterior to the interior through tappet body, said lubricant channel being open close to the assembled pin and roller.
- The cam follower roller device comprises a rolling bearing interposed between the pin and the roller.
- The cam follower roller device comprises a sliding bushing interposed between the pin and the roller.
- The cam follower roller device comprises at least one anti-rotation device on an outer periphery of the tappet body.
- The tappet body is made of steel.
- The radial plate is made of metal, for example of steel.

The invention also concerns an injection pump for a motor vehicle, equipped with a cam follower roller device as mentioned here-above.

The invention also concerns a valve actuator for a motor vehicle, equipped with a cam follower roller device as mentioned here-above.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
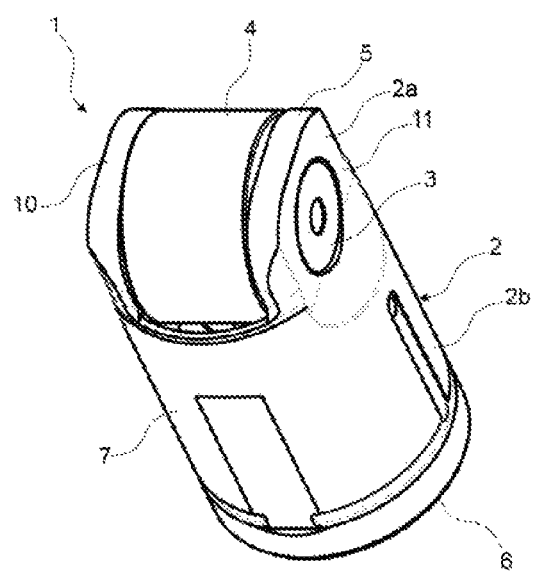
FIG. 1 is a perspective top view of a cam follower roller device.
Figure 2:
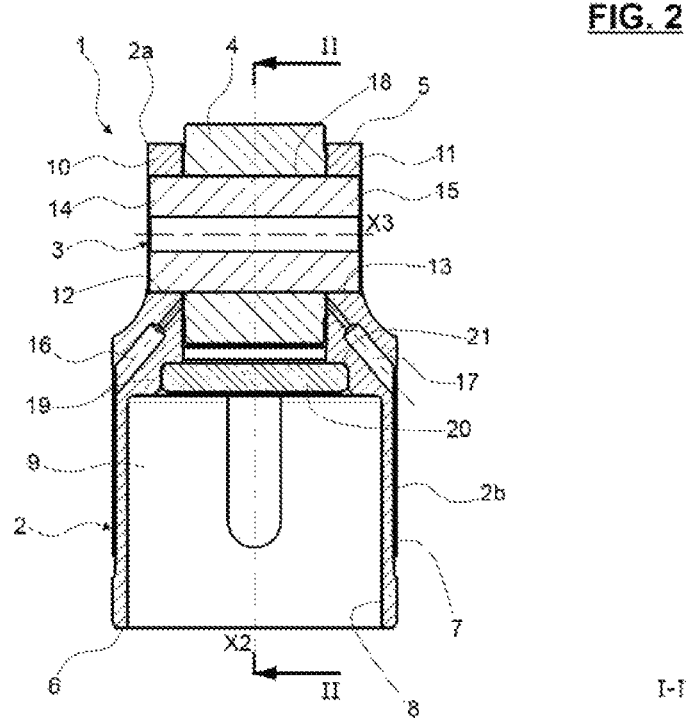
FIG. 2 is a sectional view along line I-I of a cam follower roller device according to a first embodiment of the invention.
Figure 3:
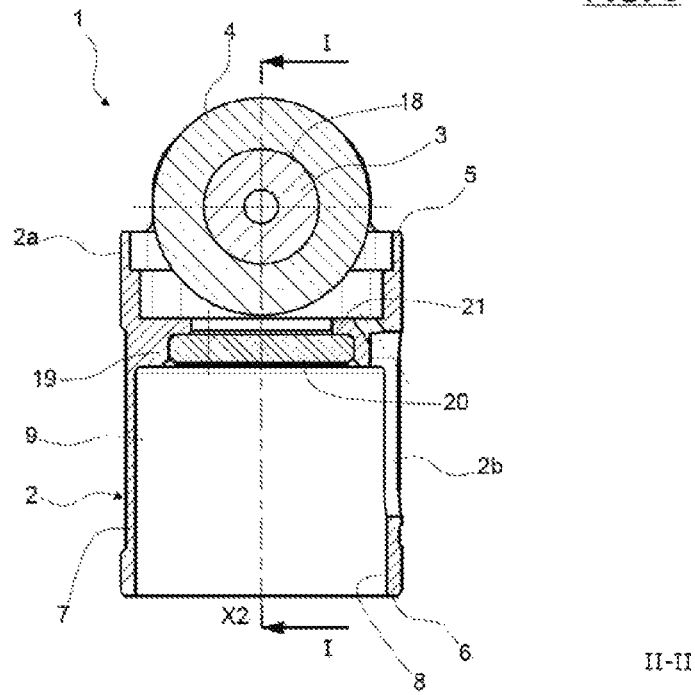
FIG. 3 is a sectional view along line II-II of said cam follower roller device.

FIGS. 1 to 3 show a cam follower roller device, designated by the general reference number 1, which can be used for example in a fuel injection pump intended for an internal combustion engine, not shown.

Device 1 comprises a tappet body 2, a pin 3 mounted on the tappet body 2, and a roller 4 mounted on the pin 2 in a rotationally movable manner. Pin 3 and roller 4 are centered on a transverse axis X3, while tappet body 2 is centered along a longitudinal axis X2. Axis X2 and X3 are perpendicular.

Hereinafter, to facilitate the special identification of the device 1 for these figures and for the following ones, the adjectives "longitudinal" and "transverse" and the adverbs "longitudinally" and "transversally" are defined relative to the axis X2 and X3, respectively. Thus, a longitudinal portion or part is parallel to the axis X2, whilst a transverse portion or part is perpendicular to said axis X2 and parallel to the axis X3.

Tappet body 2 is substantially cylindrical, is centered on axis X2 and extending between an upper edge 5 and a lower edge 6. Tappet body 2 defines an outer surface 7 and an inner bore 8 delimiting a cavity 9. Cavity 9 is adapted to receive the pin 3 and roller 4 in an upper side 2a of tappet body 2, and a piston (not shown) in a lower side 2b.

Outer surface 7 of lower side 2b of tappet body 2 is cylindrical. Tappet body 2 is movable back and forth along axis X2, in a non-represented bore belonging to the injection pump or motor with surface 7 of lower side 2b sliding in this bore. Cam follower roller device 1 comprises anti-rotation means (not shown) to prevent any rotation of said tappet body 2 in this bore.

Material of tappet body 2 is chosen resistant to oil and its additives and temperature variations. According to the invention, tappet body 2 is machined from a metal tube or bar, for example made in steel.

Upper side 2a of tappet body 2 comprises two ears 10, 11 that longitudinally upwardly protrude from lower side 2b of tappet body 2, said ears transversally facing one another. Cylindrical through-holes 12, 13 are transversally provided through said ears 10, 11, respectively. Through-holes 12, 13 of tappet body 2 are transversally facing one another and support pin 3.

Pin 3 is cylindrical and extends along the transverse axis X3. Through-holes 12, 13 are cylindrical and adapted to receive transversally opposite ends 14, 15, respectively, of pin 3. The profile of the cylindrical through-holes 12, 13 fit the cylindrical ends 14, 15. Pin 3 is fastened by any suitable means to the tappet body 2, for example by caulking, press-fitting, gluing or welding.

Roller 4 is rotatably mounted on pin 3 by a sliding bushing 18 arranged between said pin 3 and roller 4. Alternatively, the sliding bushing may be replaced by a roller bearing with rollers or needles. Roller 4 longitudinally extends from the upper edge 5 of tappet body 2 so as to collaborate with a cam synchronized with the internal combustion engine camshaft, not shown.

Lubricant channels 16, 17 are provided from the exterior to the interior of tappet body 2, said channels extending obliquely towards the roller 4. Lubricant can be supplied closely to the rolling surface between pin 3, bushing 18 and roller 4.

According to the invention, the cavity 11 of tappet body 2 is provided with a radial plate 20 that is securely fixed within tappet bore 8.

Radial plate 20 is an individual part formed as a disk, centered on longitudinal axis X2.

Tappet bore 8 comprises a portion 19 of reduced diameter, said portion defining an inner cylindrical surface wherein the outer cylindrical surface of radial plate 20 is arranged.

Advantageously, radial plate 20 is press-fitted within said portion 19 of tappet bore 8. Alternatively or in combination, radial plate 20 may be welded, glued and/or caulked within said portion 19 so as to securely fix them together.

Any relative movement between radial plate 20 and tappet body 2 is prevented. Vibrations, micro movements, shocks are prevented during transport and service life of the cam follower roller device 1. Such a tappet body 2 ensures a safe transport of the pre-assembled device 1 and easy assembly in injection pump.

Tappet bore 8 comprises an annular inwardly transversally protruding portion 21. Protruding portion 21 is longitudinally positioned between the roller 4 and the radial plate 20. Radial plate 20 is abutting against said protruding portion 21 so as to form a longitudinal stop in upside longitudinal movement.

Radial plate 20 is dedicated to support a longitudinally movable piston (not shown), load being transmitted from piston to radial plate 20 and then to protruding portion 21 during upside longitudinal movement. Such a tappet body 2 permits to ensure load and movement transmission from longitudinally movable piston of engine towards cam follower roller device 1.

Advantageously, the radial plate 20 is made in the same material as the tappet body 2, that is to say in metal, for example steel.

Figure 4:
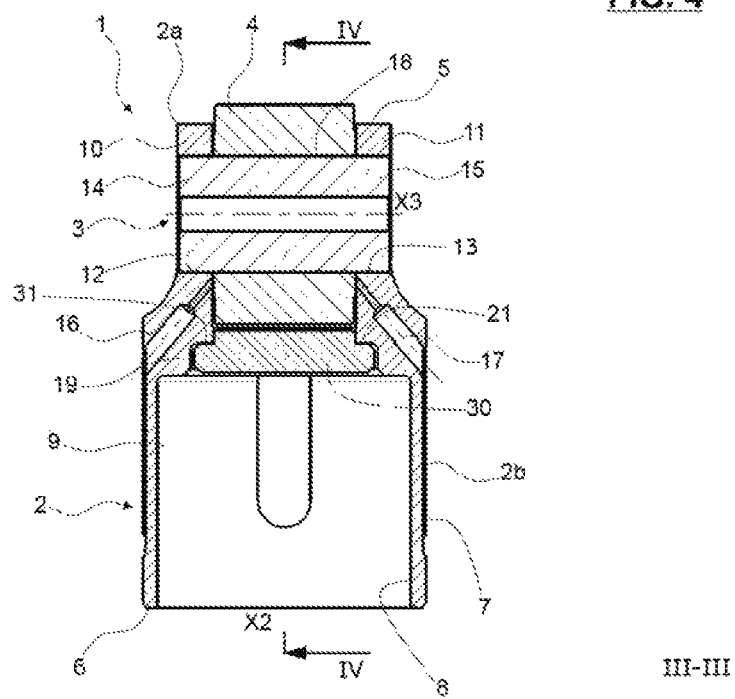
FIG. 4 is a sectional view along line of a cam follower roller device according to a second embodiment of the invention.
Figure 5:
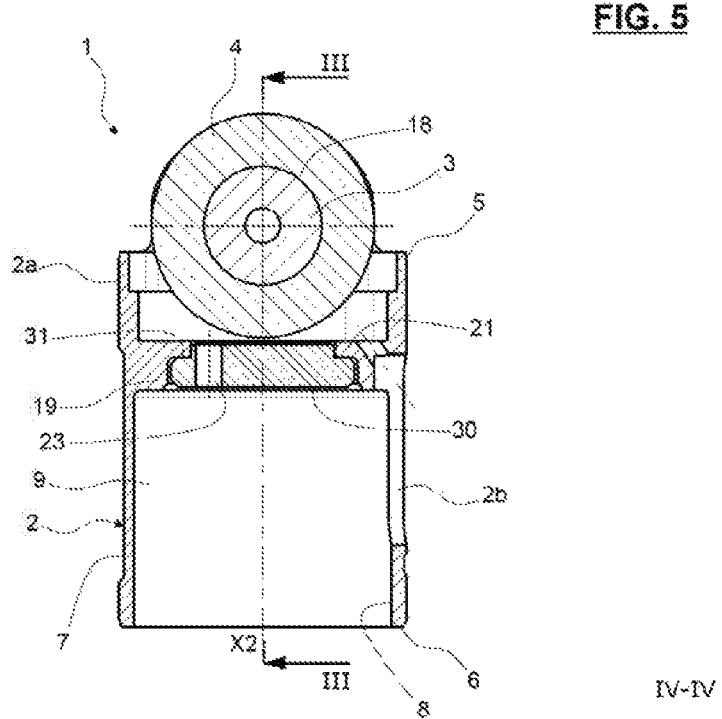
FIG. 5 is a sectional view along line IV-IV of said cam follower roller device.

A second embodiment of the invention is illustrated in FIGS. 4 and 5, wherein the same elements have the same reference numbers, and differs from the previous embodiment in that a radial plate 30 comprises an outer circumferential shoulder 31.

The outer periphery of the radial plate 30 is stepped. A first cylindrical outer surface of radial plate 30 is press-fitted in the portion 19 of tappet bore 18. A second cylindrical outer surface of radial plate 30 is of reduced diameter compared to the first surface, said second surface being arranged in bore of tappet body 2.

Such a stepped radial plate 30 of the second embodiment of the invention is of increased longitudinal thickness compared the radial plate of the first embodiment. It permits for the plate to support higher longitudinal loads from the piston.

The available material thickness in the machined tappet body 2, in particular on the roots of ears 10, 11, is strongly reduced. A stepped radial plate 30 can then be securely fixed in tappet bore 8 while having longitudinal space to extend towards the roller 4, without any contact between them.

A stepped radial plate 30 according to the second embodiment of the invention ensure a good compromise between a load support and a secured fixing.

Advantageously, a lubricant channel 23 is provided substantially longitudinally through radial plate 20.

The present invention has been illustrated on the basis of a cam follower roller device which can for example be used in a fuel injection pump intended for an internal combustion engine. It is also possible, without departing from the scope of the invention, to provide a cam follower roller device in a rocker system which is used for the control of valves of an internal combustion engine.

What is claimed is:

1. A cam follower roller device comprising:
a tappet body extending along a longitudinal axis and defining a tappet bore, the tappet body defining a first through-hole and a second through-hole
a pin centered on a transverse axis and comprising two opposite ends each separately arranged in one of the first through-hole and the second through-hole, the first through-hole transversally facing the second through-hole, and
a roller rotatably mounted on the pin around the transverse axis, an outer surface of the roller intersecting the longitudinal axis to define a roller upper end and a roller lower end, wherein the tappet body is a machined metal tube or bar, and is provided with a radial plate that is securely fixed within the tappet bore, the radial plate being provided to support a piston, the roller having first and second axial roller ends,
wherein the tappet body defines a lubricant channel therethrough, the lubricant channel having a first lubricant channel end and a second lubricant channel end, the first lubricant channel end being positioned along an outer surface of the tappet body, when any cross section is taken through a plane in which lies the longitudinal axis, the distance between an inner surface of the tappet body and the longitudinal axis, as measured perpendicularly to the longitudinal axis is constant along the inner surface of any portion of a height of the roller that is located within the tappet body, the height being defined as being between the roller upper end and the roller lower end and along the longitudinal axis when viewed on a plane which lies along the longitudinal axis, the second lubricant channel end being defined by the inner surface of the tappet body along the height of the roller such that the second lubricant channel is in facing opposition with one of the first and second axial roller ends.

2. The device according to claim 1, wherein at least one inwardly transversally protruding portion is provided in the tappet bore to form a longitudinal stop for the radial plate, the protruding portion being longitudinally positioned between the roller and the radial plate.

3. The device according to claim 1, wherein the radial plate is a disk.

4. The device according to claim 1, wherein the radial plate is stepped and comprises an outer circumferential shoulder.

5. The device according to claim 1, wherein at least one lubricant channel is provided substantially longitudinally through the radial plate.

6. The device according to claim 1, wherein the cam follower roller device comprises a rolling bearing interposed between the pin and the roller.

7. The device according to claim 1, wherein the cam follower roller device comprises a sliding bushing interposed between the pin and the roller.

8. The device according to claim 1, wherein the radial plate is made of metal.

9. A cam follower roller device comprising:
a tappet body extending along a longitudinal axis and defining a tappet bore, the tappet body defining a first through-hole and a second through-hole, the tappet body having an upper side and a lower side;
a pin centered on a transverse axis and comprising two opposite ends each separately arranged in one of the first through-hole and the second through-hole, the first through-hole transversally facing the second through-hole;
a roller rotatably mounted on the pin around the transverse axis, an outer surface of the roller intersecting the longitudinal axis to define a roller upper end and a roller lower end, wherein the tappet body is a machined metal tube or bar, and is provided with a radial plate that is securely fixed within the tappet bore, the radial plate being provided to support a piston, the roller having first and second axial roller ends, the pin and the roller being housed in the upper side of the tappet body;
the tappet body defines a lubricant channel therethrough, the lubricant channel having a first lubricant channel end and a second lubricant channel end, the first lubricant channel end being positioned along an outer surface of the tappet body, the second lubricant channel end being defined by the inner surface of the tappet body along the height of the roller such that the second lubricant channel is in facing opposition with one of the first and second axial roller ends;
the lower side of the tappet body defining a cavity configured to receive a piston therein, a portion of the tappet body forming a tappet body shoulder facing away from the roller which extends around the inner surface;
a radial plate having a plate shoulder configured such that the radial plate can be seated within the tappet body shoulder and form a portion of a base of the cavity.

* * * * *